3,414,539
PROCESS FOR STABILIZING CIS 1,4-POLYBUTA-
DIENE WITH TETRA-ALKYL BISPHENOL
Wendell S. Cook, Canal Fulton, Ohio, assignor to The
Firestone Tire & Rubber Company, Akron, Ohio, a
corporation of Ohio
No Drawing. Filed Oct. 22, 1965, Ser. No. 502,607
4 Claims. (Cl. 260—45.95)

ABSTRACT OF THE DISCLOSURE

Polybutadiene produced by lithium-based catalyst and containing 30 to 40 percent cis-1,4-structure is stabilized against deterioration during shear agitation by 2,2',6,6'-tetra-t-butyl-4,4'-biphenol.

---

This invention relates to the stabilization of polybutadiene produced by polymerization with a lithium-based catalyst, such as butyllithium, etc. when subjected to high-temperature shearing. Such polymers and their preparation are described in British Patent 817,693. They exhibit, by infrared technique, 25 to 85 percent cis-1,4-structure and substantially 6 to 15 percent 1,2-structure, the balance being trans-1,4-structure. A preferred commercial polymer contains 30 to 40 percent cis-1,4-structure and substantially 8 to 10 percent 1,2-structure.

When such polymers are subjected to high shear in the presence of oxygen at elevated temperatures up to, for example, 350° F. to 450° F. or more, they deteriorate rapidly with the production of a hard, insoluble non-elastomeric gel. It is recognized that, generally speaking, antioxidants are not effective in inhibiting such deterioration.[1] Surprisingly, the tetra-alkyl-biphenol stabilizers of this invention inhibit such deterioration of these polymers caused by shear in the presence of oxygen at elevated temperatures. They permit the drying and other processing of such polybutadienes at such high temperatures with shearing of the polymer. The polymer retains its rubbery properties even though the high-temperature treatment be continued for periods of up to 20 to 40 minutes or more, whereas without the stabilizer the maximum time that the polymers can undergo such treatment does not exceed a relatively few minutes, such as 2 to 10 minutes. Normally, the oxygen which is present is a component of air. The treatment is particularly valuable in the rapid drying of the polymer, but is also applicable during other processing operations requiring high-temperature mixing, such as, for instance, the treatment in internal mixers involving a high degree of shear.

The invention is particularly applicable to polymers with a Mooney of 35 to 55 (ML 4 at 212° F.). There is a gradual increase in the sensitivity to deterioration of these polybutadienes within this Mooney range from 35 to 55 at elevated temperatures when subjected to a high degree of shear in the presence of oxygen.

The stabilizers of this invention are 2,2',6,6'-tetra-alkyl-4,4'-biphenols in which the alkyl group contains 4 to 8 carbon atoms. They are represented by the following formula:

[1] Kraus and Rollman, "Behavior of cis-Polybutadiene During Mastication," appearing in Rubber and Chemistry Technology for September 1965, reprinted from Journal of Applied Polymer Science, 8, 2585 (1964).

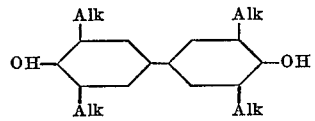

The alkyl groups which may be the same or different, contain 4 to 8 carbon atoms and include all isomers of butyl, pentyl, hexyl, heptyl and octyl. The amount of stabilizer used will be 0.01 to 1.0 part, and preferably substantially 0.25 part per 100 parts of the polymer.

Polymer samples containing different amounts of stabilizer were tested in a Brabender Plastograph at 400° F. A 40 Brabender unit viscosity rise ($V_{m+40}$) was arbitrarily chosen as the point for the initiation of gel formation in the various polymer samples. The time at which there was a sharp rise in the viscosity was recorded for each sample, as indicative of the time during which the polymer could withstand shear mixing in the presence of oxygen at 400° F.

Tests were made on 45 Mooney (ML 4 at 212° F.) polybutadiene stabilized with 0.25 part of dibutyl p-cresol and 0.005 part of N,N'-di(1-ethyl-3 methylpentyl) p-phenylenediamine which mixture suitably stabilizes this polybutadiene at normal processing temperatures of up to 350° F. in Banbury and other shear-mixers. Different amounts of the stabilizer of this invention were added to this polybutadiene. The results show that the polymer stabilized in this manner will withstand prolonged shear-mixing in the presence of oxygen at 400° F. Certain results are recorded in Table I.

TABLE I

| Stabilizer | Amount | Time to $V_{m+40}$ rise |
|---|---|---|
| Control | 0 | 6.75 |
| 2,2',6,6'-tetra-t-butyl-4,4'-biphenol | 0.05 | 9.50 |
| Do | 0.25 | 24+ |

In another test with polymer similarly previously stabilized and subjected to shearing at a temperature above 350° F., the following results were obtained:

TABLE II

| Stabilizer | Amount | Time to $V_{m+40}$ rise |
|---|---|---|
| Control | 0 | 8.5 |
| 2,2',6,6'-tetra-t-butyl-4,4'-biphenol | 0.25 | 60+ |

A further test was made to determine the effect of milling at 400° F. on the gel content of a polymer stabilized only with a stabilizer of this invention. The results are recorded in the following table.

TABLE III

| Stabilizer | Amount | Milling time (min.) | Percent gel |
|---|---|---|---|
| Control | 0 | 0 | 0.75 |
| Do | 0 | 10 | 27.95 |
| 2,2',6,6'-tetra-t-butyl-4,4'-biphenol | 0.25 | 2.5 | 0.57 |
| Do | 0.25 | 5.0 | 0.57 |
| Do | 0.25 | 7.5 | 0.85 |
| Do | 0.25 | 10.0 | 0.47 |
| Do | 0.25 | 15.0 | 0.65 |
| Do | 0.25 | 30.0 | 33.72 |
| Do | 0.25 | 45.0 | 44.70 |

In the test, 0.25 phr of 2,2',6,6'-tetra-t-butyl-4,4'-biphenol kept the gel count low for over 15 minutes, whereas the gel content of the control rose rapidly on milling for as little as 10 minutes.

What I claim is:

1. The process of inhibiting deterioration during high temperature shear agitation of polybutadiene produced by lithium-based catalyst which polybutadiene exhibits, by infra-red technique, substantially 30 to 40 percent cis-1,4-structure and substantially 8 to 10 percent 1,2-structure, the balance being essentially trans-1,4-structure, which process comprises shear-agitating the polybutadiene at 350 to 450° F. in the presence of 0.01 to 1.0 part per 100 parts of the polymer, of a 2,2',6,6'-tetraalkyl-4,4'-biphenol in which each alkyl group contains 4 to 8 carbon atoms.

2. The process of claim 1 in which the polybutadiene is dried during the shear-agitating.

3. The process of claim 1 in which the stabilizer is 2,2',6,6'-tetra-t-butyl-4,4'-biphenol.

4. The process of claim 1 in which substantially 0.25 part of the stabilizer is added per 100 parts of the polybutadiene.

References Cited

UNITED STATES PATENTS

| 2,785,188 | 3/1957 | Coe | 260—45.95 |
| 3,156,543 | 11/1964 | Coffied et al. | 260—45.95 |

FOREIGN PATENTS 817,693  7/1959  Great Britain.

OTHER REFERENCES

Binder Industrial and Eng. Chem., vol. 46, No. 8, August 1954, pp. 1727–1730.

DONALD E. CZAJA, *Primary Examiner.*

H. E. TAYLOR, *Assistant Examiner.*